W. H. BATEMAN.
SEPARATOR EMPLOYED FOR THE SEPARATION OF LIQUIDS OF DIFFERENT DENSITY.
APPLICATION FILED JAN. 17, 1922.

1,421,658.

Patented July 4, 1922.

Inventor
W. H. Bateman:
by
Attorney.

W. H. BATEMAN.
SEPARATOR EMPLOYED FOR THE SEPARATION OF LIQUIDS OF DIFFERENT DENSITY.
APPLICATION FILED JAN. 17, 1922.

1,421,658.

Patented July 4, 1922.
2 SHEETS—SHEET 2.

Inventor
W. H. Bateman
by
Attorney.

UNITED STATES PATENT OFFICE.

WILLIAM HENRY BATEMAN, OF LONDON, ENGLAND.

SEPARATOR EMPLOYED FOR THE SEPARATION OF LIQUIDS OF DIFFERENT DENSITY.

1,421,658.  Specification of Letters Patent.  Patented July 4, 1922.

Application filed January 17, 1922. Serial No. 529,973.

*To all whom it may concern:*

Be it known that I, WILLIAM HENRY BATEMAN, a subject of the King of Great Britain and Ireland, residing at 23 Great Winchester Street, London, E. C., England, have invented certain new and useful Improvements Relating to Separators Employed for the Separation of Liquids of Different Density, of which the following is a specification.

This invention relates to separators employed for the separation of liquids of different density.

The invention is especially applicable to the separation of water from the condensate produced in the distillation of crude oil where the distillation is effected, as is usual, in the presence of steam, and where thus a considerable quantity of water is recovered with the condensate and requires separation therefrom.

The invention relates to an improved regulator for such separators and the invention is applicable to any vessel in which the liquids are admitted for settling at different levels according to their respective densities; and the regulator may be applied to this vessel as a separate apparatus disposed in proper relation thereto, in order that, irrespective of the relative rates at which the liquids enter the settling chamber, the predetermined combined volume of the two liquids retained in the settling chamber may be constantly maintained, and the relative quantities of each be variable by the means hereafter described in detail. Means are also provided whereby the conditions of levels both relative and actual existing within the separator, are visibly reproduced in the regulator.

The connection between the regulator and the separator in respect to the less dense liquid is such that a liquid seal is provided preventing the escape of vapour or gas from the separator.

According to the invention the regulator comprises a casing divided into a number of compartments one of which is connected for the admission therein of the denser liquid and another for the admission of the less dense liquid, and each of these compartments communicates with a third so that the conditions as to level of the liquid in the main vessel or separator are thus reproduced therein, and this third compartment is provided with a sight glass or transparent cover plate so that the respective levels are visible. The less dense liquid flows from its compartment over a weir to enter an adjacent compartment to which the outlet pipe is connected. The weir thus provides the path for discharge of the less dense liquid, and the maximum height of the combined column maintained within the separator is determined by the weir, while the denser liquid may overflow through a vertically disposed overflow outlet pipe mounted within the first compartment referred to, and the height of the column of the denser liquid within this compartment may be varied by suitable means, such as by providing the upper part of the outlet overflow pipe movable with reference to the main part, which latter may be integrally provided with the casing and may have a downwardly protruding part to which the outlet pipe for the dense liquid is connected. The weir is advantageously of a height to ensure that the inlet for the less dense liquid to the corresponding compartment of the regulator is always submerged and thus sealed against the passage of vapour or gas.

The invention comprises the construction hereinafter described.

The invention is illustrated by way of example in the accompanying drawings in which—

Figure 5 is a plan corresponding to Figures 1 and 2, while

In carrying the invention into effect according to one construction of regulator for the purpose of separating water from oil as illustrated in the accompanying drawings, the regulator is provided as a casing $a$ which conveniently may take an oblong rectangular form, and is secured to the main vessel or separator $b$. The oil level in separator $b$ is indicated at $z$, and the water level $z^1$. The casing $a$ of the regulator is divided into a number of compartments as hereinbefore described by means of integral partitions. At one end a compartment 1 is provided for the denser liquid or water and for this purpose a connecting pipe $c$ beneath is provided, having a branch $c^1$ serving as the water inlet pipe and opening into the compartment 1, and another branch $c^2$ opening at the bottom of the main vessel or separator $b$, so that thus the water passes from the separator $b$ into this connecting pipe $c$ and rises into the water compartment 1 until equilibrium is established. The outlet pipe $d$ is provided in this compartment as a vertical overflow pipe, being disposed in position adjacent the water inlet $c^1$; and the outlet pipe $d$ is provided with its upper part $d^1$ adjustable for the variation of the height of the column of water to maintain equilibrium. For this purpose the upper part $d^1$ of the outlet pipe is provided as a cylindrical sleeve having a screw threaded bore, and the upper end of the main part of the outlet pipe $d$ may be screw threaded on its exterior. At the upper end the movable part $d^1$ of the outlet pipe $d$ is conveniently provided with a cross bar $e$ by means of which it may be rotated for the purpose of adjusting the level of its upper edge, and thus of adjusting the level at which the water overflows, and is discharged from the compartment 1. This compartment 1 of the regulator may conveniently be left uncovered so that thus the outlet overflow pipe $d$ $d^1$ may at any time be conveniently adjusted.

Figure 1:
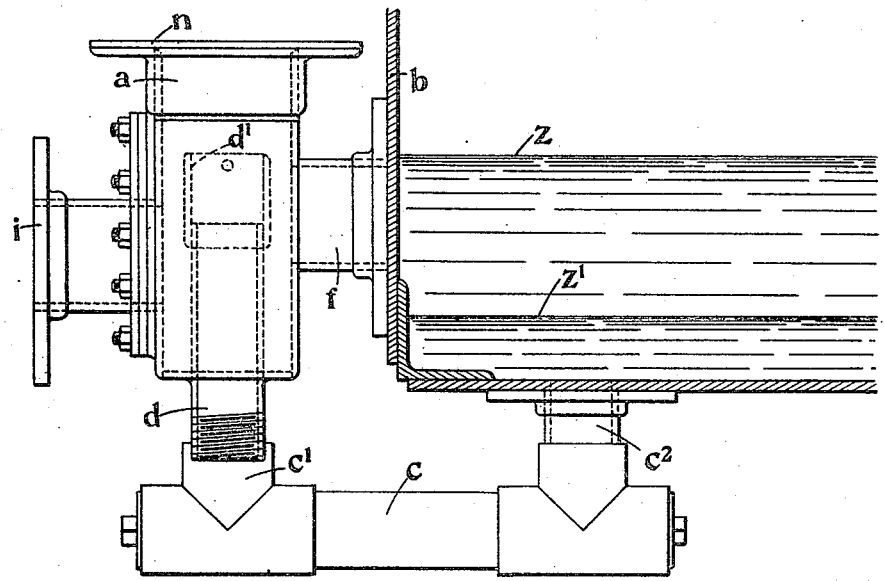
Figure 1 is a side elevation of a regulator constructed according to the invention and applied to a separator.
Figure 3:
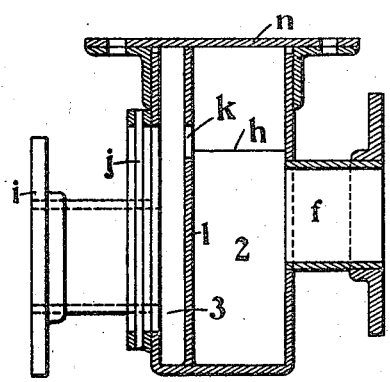
Figure 3 is a sectional elevation on the line $x$—$x$ Figure 2.
Figure 4:
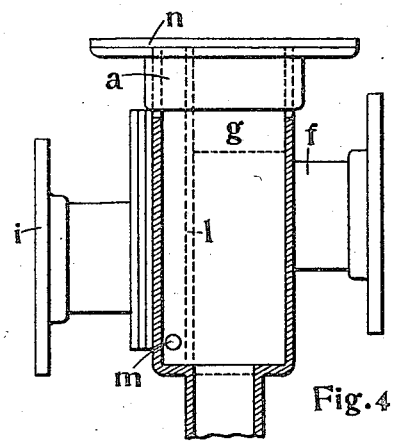
Figure 4 is a sectional elevation on the line $y$—$y$ Figure 2.
Figure 2:
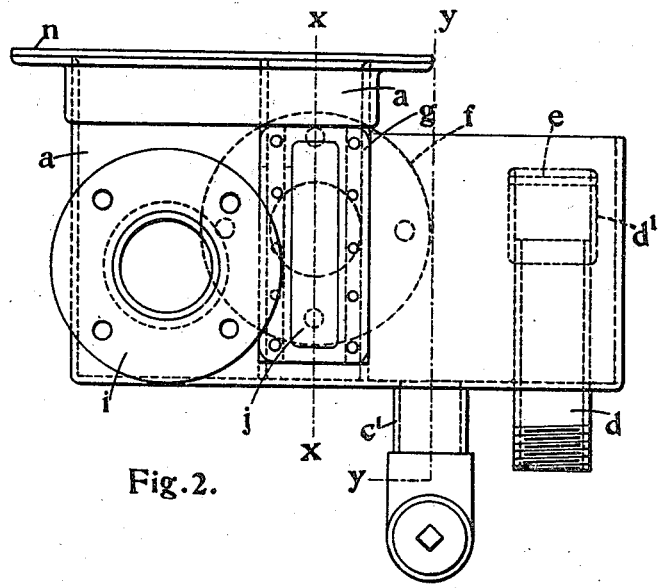
Figure 2 is a front elevation corresponding to Figure 1.
Figure 5:
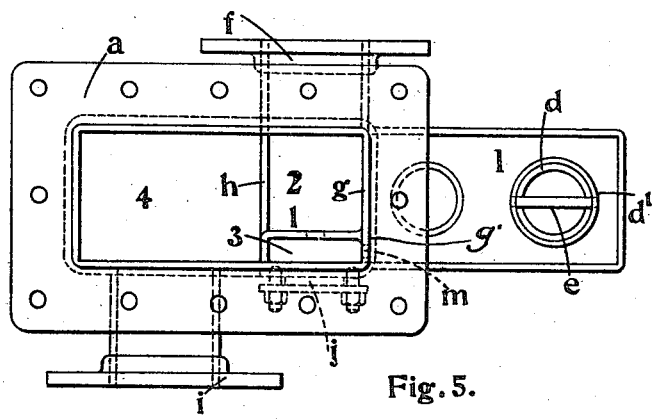
Figure 6:
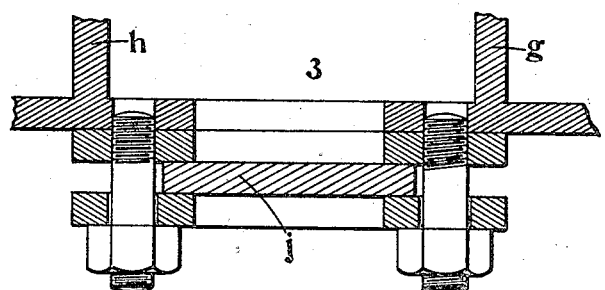
Figure 6 is a detail section.

The casing $a$ of the regulator on one side is provided with a tubular connection $f$ which opens into a central compartment 2 for the less dense liquid or oil, and this compartment is completely separated from the water compartment 1 by a transverse partition $g$, and this connection $f$ is secured in proper position on the side of the main vessel or separator $b$, so that the outlet lies entirely submerged and serves for the admission of oil into the oil compartment 2, and provides a seal preventing the escape of vapour or gas from the separator. On the side opposite to that of the partition $g$ dividing the water compartment 1 from the oil compartment 2, another parallel partition $h$ is provided as a weir, which serves to determine the maximum height of the combined column of oil and water, and thus extends short of the extreme height of the casing as illustrated in Figure 3; while on the other side of the weir $h$, an outlet compartment 4 for the oil is provided, and a tubular outlet fitting $i$ is advantageously provided for this compartment, on the side opposite to that at which the tubular inlet connection $f$ is provided as hereinbefore described, so that thus as the oil passes into the compartment 2 and rises above the level of the weir $h$ it overflows to the outlet compartment 4 and thence passes out.

In front of the oil compartment 2 and between the water compartment 1 and the oil outlet compartment 4, another compartment 3 is provided, the outer wall of which is formed as a glass cover plate $j$, and serves to indicate the level of the respective liquids. For this purpose the partition 1, between this compartment 3 and the oil compartment 2 at the rear, has provided within it a communicating hole $k$, at a level slightly beneath that of the edge of the weir $h$, while in a partition $g'$, which is an extension of the partition $g$, and which is between the compartment 3 and the water compartment 1, a communicating hole $m$ is provided, near the bottom, so that thus oil and water flow into this compartment from the respective water and oil compartments 1 and 2, being subject to the same conditions of equilibrium as the liquids in the separator. Thus the respective levels of oil and water are indicated in the compartment 3, to correspond with those obtaining in the separator $b$, the levels being visible through the glass cover plate $j$. The walls of the casing $a$ adjacent the oil compartment 2, and the oil outlet compartment 4 are advantageously upwardly extended for the reception of a cover plate $n$, and the walls of the compartment 3 may also be extended to contact with the cover plate $n$.

The compartment 3 serving for the purpose of reproducing the levels of the respective liquids in the separator $b$ may be disposed in any other convenient relation than specifically hereinbefore described.

I claim:

1. An outflow regulator for separators employed for the separation of liquids settling at different levels according to their densities, comprising a casing formed into two adjacent compartments, connections between the said respective compartments and the separator adapted for the admission into the respective compartments of the denser and less dense liquids from the separator, means comprising an outlet pipe in one of the said compartments, said outlet pipe being open at its upper end and adapted to serve as the downward path of discharge of the denser liquid from the said compartment, and a weir in the second compartment for determining the maximum height of the combined column of liquids within the separator, said weir serving as the path of discharge of the less dense liquid from the separator, substantially as described.

2. An outflow regulator for separators employed for the separation of liquids settling at different levels according to their densities, comprising a casing having two compartments, means between the said casing and the separator adapted for the admission into the respective compartments of the denser and less dense liquids from the separator, means whereby the said respective liquids may overflow from the said respective compartments comprising an outlet pipe in one compartment for the denser liquid and a weir in the compartment for the less dense liquid, the said weir being so disposed as to maintain a liquid seal against the escape of vapour or gas from the separator, substantially as described.

3. An outflow regulator for separators employed for the separation of liquids settling at different levels according to their densities comprising a casing having two compartments, means between the said casing and the separator adapted for the admission into the said respective compartments of the denser and less dense liquids from the separator, means whereby the said respective liquids may overflow from the said respective compartments, and a third compartment communicating respectively with the said two compartments by means adapted to reproduce in the said third compartment the levels of the respective liquids in the separator, substantially as described.

4. An outflow regulator for separators employed for the separation of liquids settling at different levels according to their densities comprising a casing having two compartments, means between the said casing and the separator adapted for the admission into the said respective compartments of the denser and less dense liquids from the separator, means whereby the said respective liquids may overflow from the said respective compartments, and a third compartment communicating respectively with the said two compartments by means adapted to reproduce in the said third compartment the levels of the respective liquids in the separator, and an outlet compartment in the said casing into which the less dense liquid may flow from one of the said compartments into which the less dense liquid passes from the separator, substantially as described.

5. An outflow regulator for separators employed for the separation of liquids settling at different levels according to their densities, comprising a casing having two open compartments, means between the said casing and the separator adapted for the admission into the said respective compartments of the denser and less dense liquids from the separator, means whereby the said respective liquids may overflow from the said respective compartments, a third open compartment communicating respectively with the said two compartments by means adapted to reproduce in said third compartment the levels of said respective liquids in the separator, and a cover plate for the said casing adapted to close the compartments in which the less dense liquid passes, substantially as described.

6. An outflow regulator for separators employed for the separation of liquids settling at different levels according to their densities, comprising a casing having two compartments, means between the said casing and the separator adapted for the admission into the said respective compartments of the denser and less dense liquids from the separator, the compartment for the denser liquid being open, means whereby the said respective liquids may overflow from the said respective compartments, said means comprising an outlet pipe in the compartment of the denser liquid by which the column of the denser liquid within the said compartment is adjustable in height, substantially as described.

WILLIAM HENRY BATEMAN.